(12) United States Patent
Ricalde

(10) Patent No.: US 8,590,171 B2
(45) Date of Patent: Nov. 26, 2013

(54) TAPE MEASURE APPARATUS WITH A ROTATING AND SLIDING CATCH

(76) Inventor: Paul Ricalde, Mandeville, LA (US)

( * ) Notice: Subject to any disclaimer, the term of this patent is extended or adjusted under 35 U.S.C. 154(b) by 76 days.

(21) Appl. No.: 13/306,684

(22) Filed: Nov. 29, 2011

(65) Prior Publication Data

US 2013/0133216 A1 May 30, 2013

(51) Int. Cl.
*G01B 3/10* (2006.01)
(52) U.S. Cl.
USPC .............................. 33/770; 33/758
(58) Field of Classification Search
USPC ................. 33/755, 757, 758, 768, 770
See application file for complete search history.

(56) References Cited

U.S. PATENT DOCUMENTS

| | | | |
|---|---|---|---|
| 841,272 A | 1/1907 | Read | |
| 1,066,972 A | 7/1913 | Aitken | |
| 1,102,436 A | 7/1914 | Richardson | |
| 1,223,644 A * | 4/1917 | Tripp | 33/755 |
| 1,303,756 A | 5/1919 | Ballou | |
| 1,646,826 A | 10/1927 | Langsner | |
| 1,860,635 A | 5/1932 | Thompson | |
| 2,770,883 A * | 11/1956 | Hackney | 33/770 |
| 3,362,075 A * | 1/1968 | Quenot | 33/770 |
| 3,611,576 A * | 10/1971 | Quenot | 33/770 |
| 3,965,579 A | 6/1976 | Woods | |
| 4,924,597 A | 5/1990 | Tursi | |
| 5,458,946 A | 10/1995 | White, Jr. | |
| 5,600,894 A | 2/1997 | Blackman et al. | |
| 5,894,677 A | 4/1999 | Hoffman | |
| 6,101,734 A * | 8/2000 | Ten Caat et al. | 33/770 |
| 6,108,926 A * | 8/2000 | Fraser et al. | 33/768 |
| 6,115,931 A | 9/2000 | Arcand | |
| 6,370,790 B1 | 4/2002 | Stenger | |
| 6,442,863 B1 | 9/2002 | Poineau et al. | |
| 6,497,050 B1 | 12/2002 | Ricalde | |
| 6,637,126 B2 | 10/2003 | Balota | |
| 6,691,426 B1 | 2/2004 | Lee et al. | |
| 6,796,052 B1 * | 9/2004 | Lin | 33/758 |
| D514,962 S | 2/2006 | Armendariz | |
| 6,996,915 B2 | 2/2006 | Ricalde | |
| 7,055,260 B1 | 6/2006 | Hoffman | |
| 7,168,182 B2 | 1/2007 | Kilpatrick et al. | |
| 7,181,860 B1 | 2/2007 | Umholtz | |
| 7,185,446 B1 * | 3/2007 | King | 33/755 |
| 7,240,439 B2 | 7/2007 | Critelli et al. | |
| 7,281,340 B2 | 10/2007 | Greally | |
| 7,415,778 B1 | 8/2008 | McEwan et al. | |
| 7,484,313 B1 | 2/2009 | Ogilvie | |
| 7,487,600 B1 | 2/2009 | Cooper | |
| 7,596,881 B1 | 10/2009 | Bourgeois | |
| 7,676,949 B1 | 3/2010 | Lungu et al. | |
| 7,716,848 B1 | 5/2010 | Calvey | |
| 7,918,037 B1 | 4/2011 | Polkhovskiy | |
| 2002/0011008 A1 | 1/2002 | Nelson et al. | |
| 2002/0073570 A1 | 6/2002 | Conder | |
| 2003/0167651 A1 * | 9/2003 | Pedersen | 33/768 |
| 2004/0049939 A1 * | 3/2004 | Rafter | 33/770 |
| 2008/0098610 A1 * | 5/2008 | Lipps | 33/770 |
| 2010/0050456 A1 * | 3/2010 | Huang | 33/770 |

FOREIGN PATENT DOCUMENTS

RU 63925 6/2007

* cited by examiner

*Primary Examiner* — G. Bradley Bennett
(74) *Attorney, Agent, or Firm* — Garvey, Smith, Nehrbass & North, L.L.C.; Brett A. North

(57) ABSTRACT

An improved tape measure apparatus which includes a catch that is both slidable and rotatable relative to the rule blade in a plane which is perpendicular to the longitudinal axis of the rule blade when the rule blade is extended from the tape casing.

19 Claims, 13 Drawing Sheets

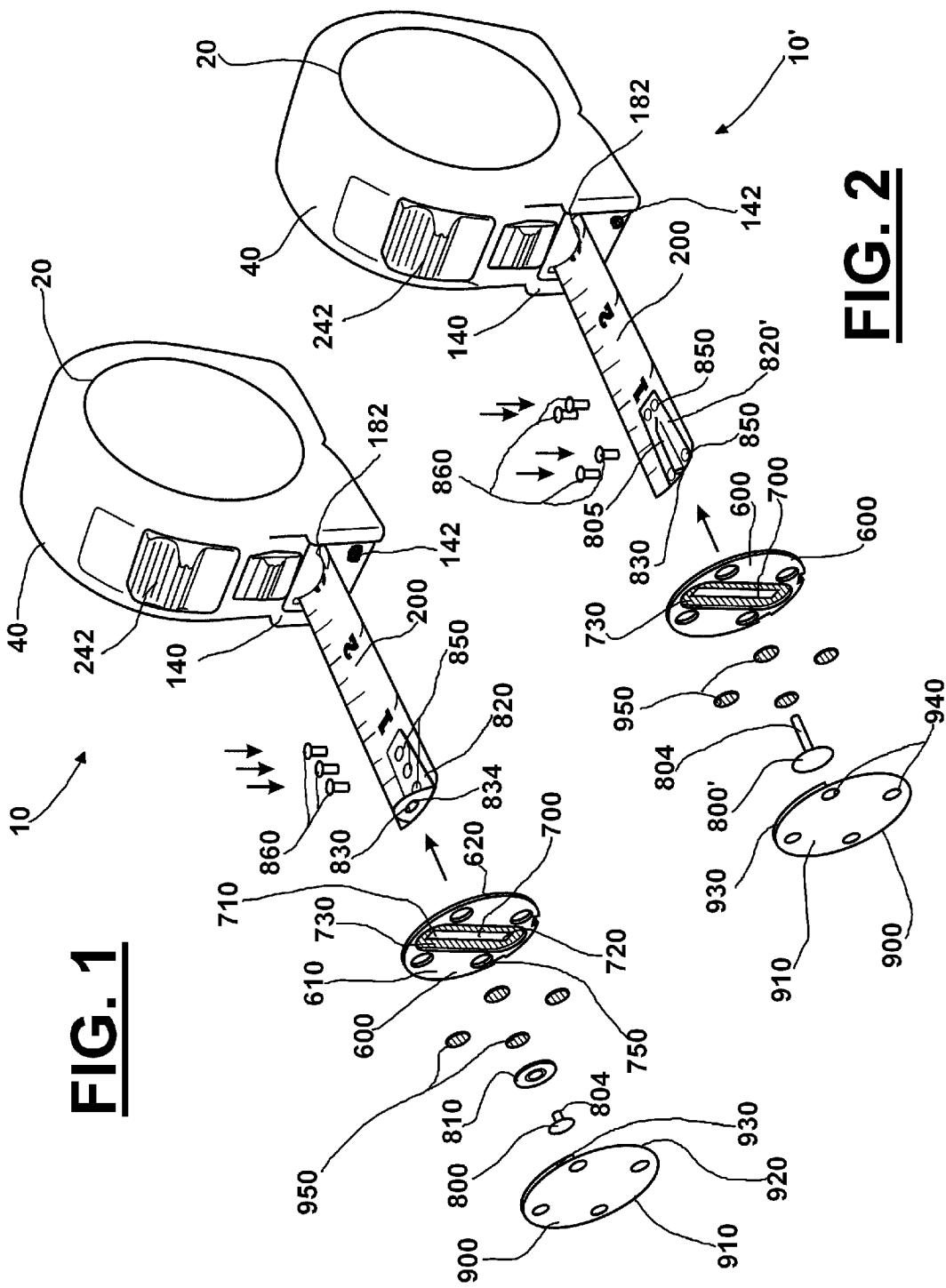

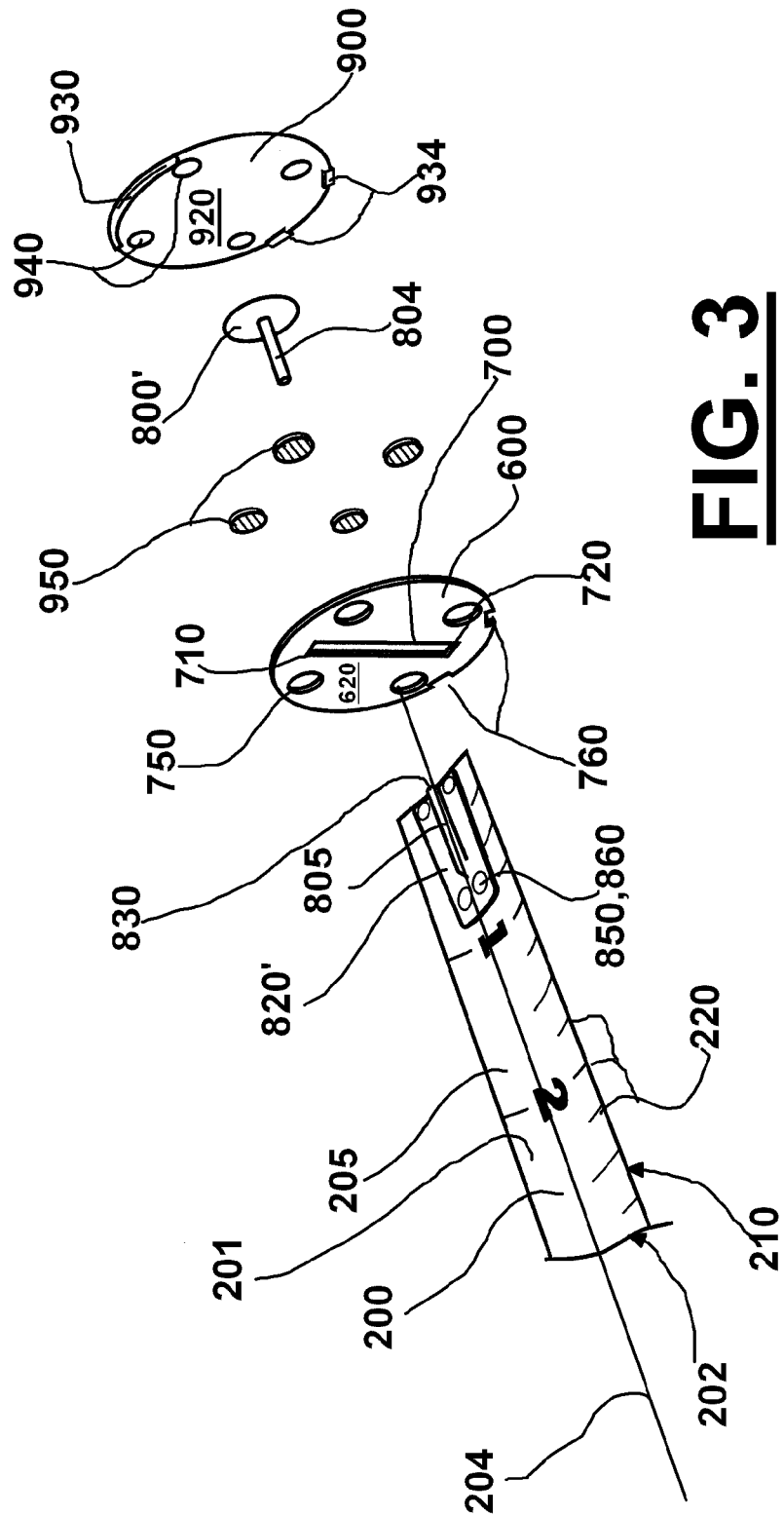

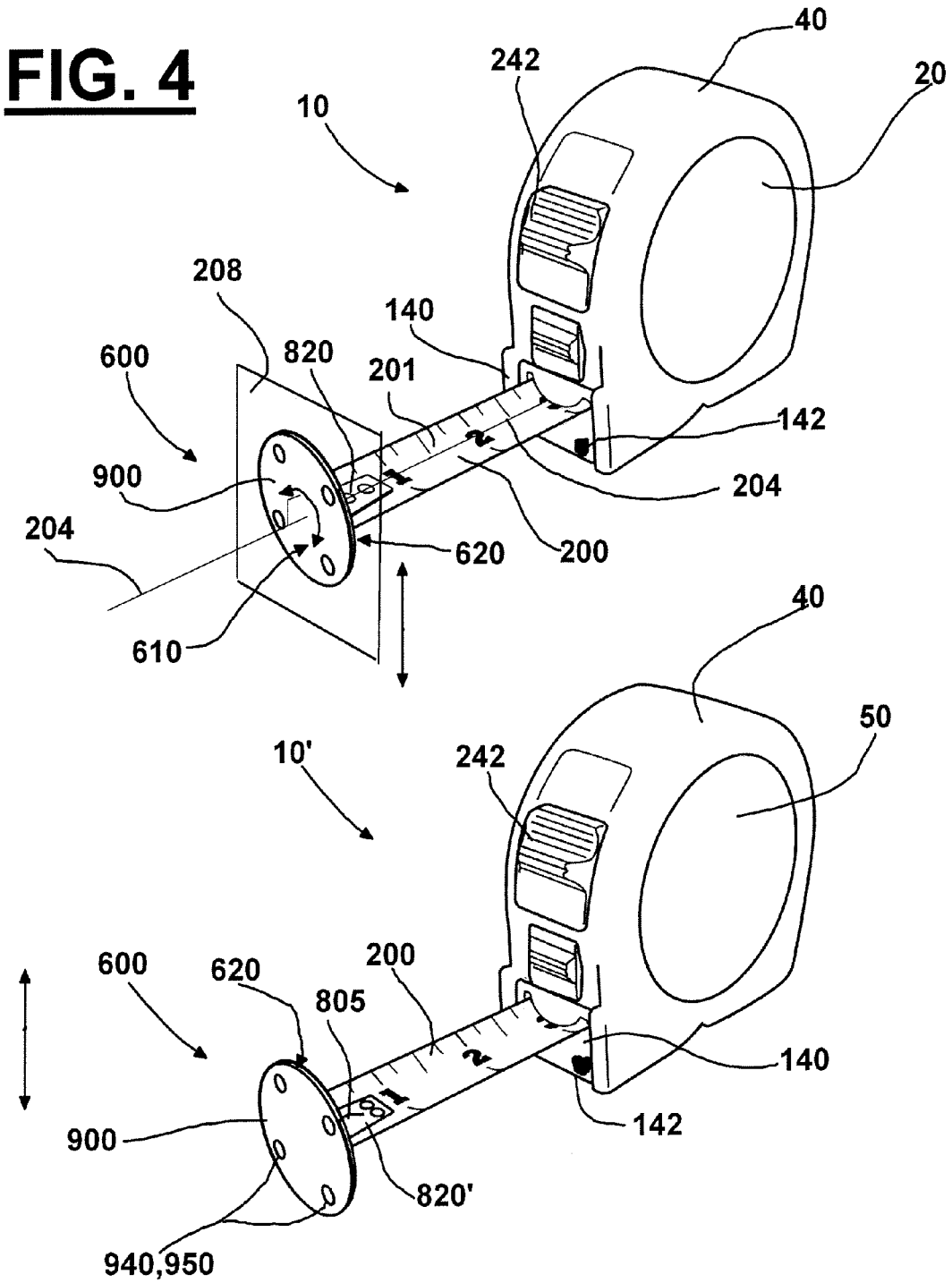

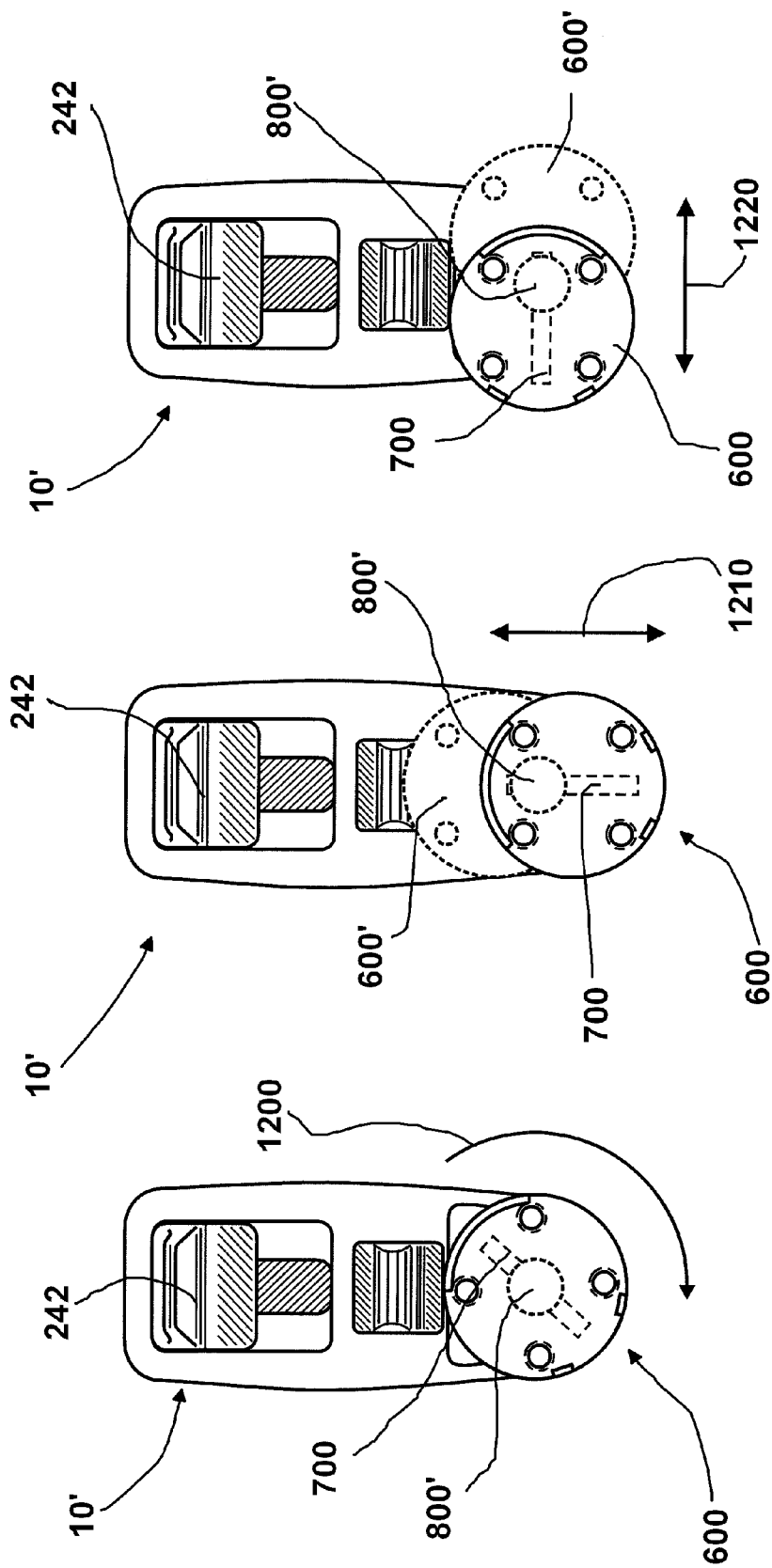

TAPE MEASURE APPARATUS WITH A ROTATING AND SLIDING CATCH

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND

One embodiment relates generally to carpentry tools and, more specifically, to an improved tape measure apparatus which includes a rotating and sliding catch.

Standard tape measures include a length of tape wound on a spool with a spring return mechanism so that after the tape is taken out of a housing, the spring return mechanism automatically retracts the tape into the housing. A locking mechanism, typically a sliding button, locks the tape for the purpose of reading the length of the deployed tape.

Numerous tape measures have been provided in prior art. For example, U.S. Pat. No. 2,624,120 to Mills; U.S. Pat. No. 4,574,486 to Drechsler; and U.S. Pat. No. 5,390,426 to Hull are illustrative of the prior art and incorporated herein by reference to show the conventional construction of tape measures. While these units may be suitable for the particular purpose to which they address, they would not be as suitable for the purposes of the present invention as heretofore described. Tape measures are well adapted for measuring distances but their utility is usually restricted to this single function.

In order to make catches or end hooks connected to the measuring tape as an entity, and to prevent inconvenience of carrying the tape measures, the areas of end hooks are small as possible. However, since the catches or end hooks are used to grab/hook onto an edge portion of an article being measured, and the rule blade pulled out to the second dimension being measured, small area catches/end hooks make it difficult to grab/hook onto the article being measured with the catches/end hooks tending to slide away causing rewinding of the rule blade and irritation to the user. Additionally, because conventionally available catches/end hooks point downwardly relative to the tops of rule blades, measurements requiring grabbing/hooking by the catches are limited to situations where the rule blade is facing up. This situation makes it inconvenient for users wishing to grab/hook onto the underside edge of an object to be measured.

In certain instances the catches or end hooks to tape measures actually inhibit proper measurements. In these instances catches which can both slide and rotate to accommodate restrictions in the item/surface being measured would be desirable. In the instant application catch and end hook are intended to be synonymous terms and will be used interchangeably.

While certain novel features of the invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. What is provided in one embodiment is a tape measure with a catch that is both rotatable and slidable relative to the rule blade.

In this application rotation and sliding are to be considered different types of movements. In this application rotation of the catch occurs when the catch rotates or pivots relative to the rule blade. The term slide is intended to mean relative movement of the catch with respect to the rule blade which is different from rotation. Of course both types of movement of the catch can occur simultaneously and/or sequentially to allow the catch to move from a first position relative to the rule blade to a second position relative to the rule blade.

In one embodiment the catch is slidable when after the rule blade has been extended past the user's arm span. In one embodiment this slidability occurs by using the rule blade to place a force on the catch/end hood in contact with another surface (such as by tapping the catch on the surface to position the catch relative to the rule blade).

In one embodiment the catch can be moved by force applied on the catch from the rule blade itself.

In one embodiment is provided a tape measure apparatus comprising:

a) a casing having two side walls, a bottom wall, a rear wall, and a front wall defining an enclosure, the front wall having a blade aperture adjacent the bottom wall;

b) a rule blade having inner and outer end portions and being retractably stored in a coiled condition within said enclosure of the casing, the inner end of the rule blade secured within the enclosure, the outer end of the rule blade protruding through the blade aperture when extended during use, and when extended during use the rule blade having a longitudinal axis;

c) graduated indicia markings along the length of said rule blade, functioning as a measuring scale;

d) a catch operatively connected to the outer end of the rule blade, the catch being slidable relative to the outer end of the rule blade in a plane which is perpendicular to the longitudinal axis of the rule blade.

In one embodiment the catch can be rotatable relative to the outer end of the rule blade in the plane which is perpendicular to the longitudinal axis of the rule blade, and wherein rotation can exceed 270 degrees and can be about points which include the geometric center of the face of the catch along with points which are offset from the geometric center of the face of the catch.

In one embodiment the catch can includes a slot, and the slot is operatively connected to the rule blade with a fastener.

In one embodiment the catch can include first and second faces, the second face facing the rule blade, the first face having a peripheral recessed area on either side of the slot, the fastener including a head, and the head being accommodated by the recess so that it does not protrude beyond the first face.

In one embodiment the catch can include a cover which covers the peripheral recessed area and the head.

In one embodiment the catch can have a maximum dimension and the catch is slidable relative to the rule blade at least about 50 percent of the maximum dimension. In other embodiments at least about 25, 30, 35, 45, 50, 55, 60, 65, 70, 75, 80, 85, 90, 92, 94, 96, 97, 98, and 99 percent of the maximum dimension. In other embodiments the range of slidability is between any two of the above specified percentages.

In one embodiment the rule blade has upper and lower surfaces, and when the catch is slid to one extreme of its sliding motion, the catch is flush with the lower surface of the rule blade.

In one embodiment the catch can be circular in shape, the slot is located on a diameter of the catch and in the middle of the diameter.

In one embodiment the catch can include a magnetized surface on its first face.

In one embodiment the catch can include a magnetized surface on its second face.

In one embodiment the catch can be frictionally held in place relative to the rule blade.

In one embodiment when the rule blade is extended more than twelve inches, a force can be imposed on the tape measure casing or rule blade causing the catch to slide relative to the rule blade in the plane perpendicular to the longitudinal axis.

In one embodiment the catch can be frictionally held in place relative to the rule blade.

In one embodiment when the rule blade is extended more than twelve inches, force can be imposed on the tape measure casing or rule blade causing the catch to both slide and rotate relative to the rule blade in the plane perpendicular to the longitudinal axis.

In one embodiment the catch can be frictionally held in place regarding sliding relative to the rule blade, and a force between the catch and the rule blade is required to begin sliding of the catch relative to the rule blade. In various embodiments the force required is less than about 10, 8, 6, 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.005, and 0.001 pounds force. In other embodiments the force required to begin sliding is between about any two of the above specified forces.

In one embodiment the catch can be frictionally held in place regarding rotation relative to the rule blade, and a torque between the catch and the rule blade is required to begin rotation of the catch relative to the rule blade. In various embodiments the force required is less than about 10, 8, 6, 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.005, and 0.001 inch-pounds force of torque. In other embodiments the torque required to begin rotation is between about any two of the above specified torques.

In one embodiment the catch can also be slidable in a direction parallel to the longitudinal axis of the rule blade.

For a further understanding of the nature, objects, and advantages of the present invention, reference should be had to the following detailed description, read in conjunction with the following drawings, wherein like reference numerals denote like elements. However, the drawings are illustrative only, and changes may be made in the specific construction illustrated and described within the scope of the appended claims.

BRIEF DESCRIPTION OF THE SEVERAL VIEWS OF THE DRAWINGS

FIG. 1 is an exploded view of L-bracket version (including a backing plate to stabilize the main plate).

FIG. 2 is an exploded view of alternative version using a pin to mount the plate instead of rivet to an L bracket.

FIG. 3 is a perspective view of the catch portion of FIG. 2 but viewed from the opposite view as shown in FIG. 2.

FIG. 4 is a perspective view of assembled L bracket version.

FIG. 5 is a perspective view of assembled alternative version.

FIGS. 15-17 schematically indicate the allowable motions which can be made between the catch and the rule blade.

DETAILED DESCRIPTION

Figure 6:
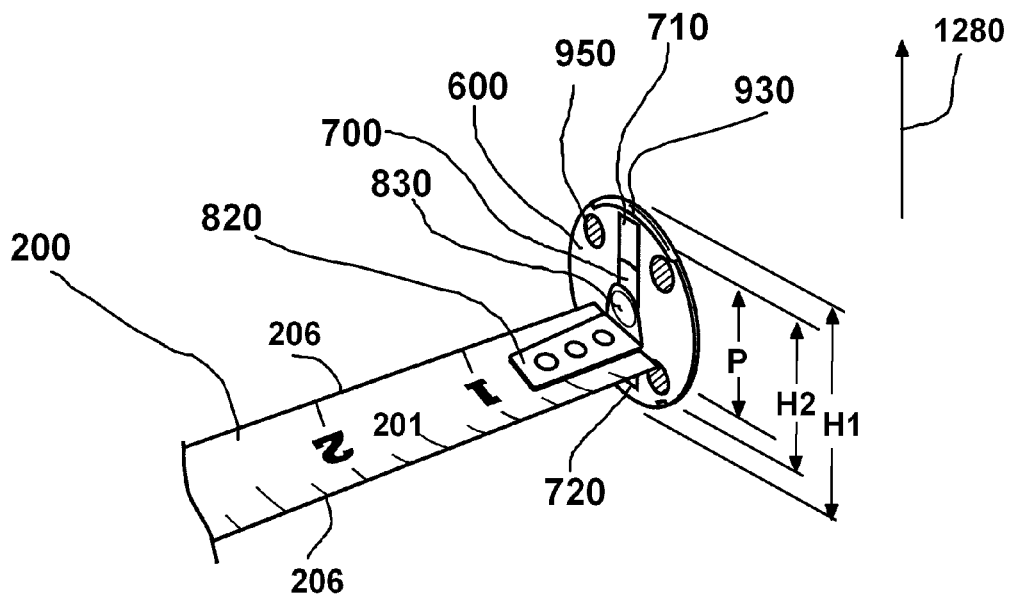
FIG. 6 is a perspective view of assembled L bracket version shown in FIG. 3, but viewed from the opposite side as shown in FIG. 4.

One embodiment provides a tape measure apparatus 10 which can include a conventional type tape measure 20 comprising a casing 40 having two side walls 60, a top wall 80, a bottom wall 100, a rear wall 120 and a front wall 140 defining enclosure 160. Front wall 140 has a rule blade aperture 180 adjacent to bottom wall 100.

Rule blade 200 is normally retractably stored in a coiled condition within enclosure 160 of casing 40. An inner end 205 of rule blade 200 is secured within enclosure 160, while an outer end 210 of rule blade 200 protrudes through blade aperture 180 in casing 40. A lock and automatic rewind switch 240 can be carried on top wall 80 or front wall 140 of casing 40, to keep a portion of rule blade 200 in an extended locked position through blade aperture 180 in casing 40. Switch 240 is manually operated to retract rule blade 200 into enclosure 160 of casing 40.

Rule blade 200 is elongated, slightly concave and fabricated out of a substantially strong and durable material and can have a longitudinal axis 202. Graduated indicia markings 220 along the length of the rule blade 200 function as a measuring scale, which can be positioned at any of a variety of English standard intervals, including 1", ½, ¼", and the like, as well as Metric standard intervals including 5 mm, 1 cm, 5 cm, and the like. Graduated indicia markings 220 can be of similar or different dimensions and shapes for aiding in identifying the respective measurement. In one embodiment the rule blade 200 has upper surface 201 (with upper edges 206) and lower 203 surface.

Catch or end hook 600 can be slidably and rotatably connected to outer end 210 of rule blade 200. Catch or end hook 600 can adapted to be normally laid over an edge 300 of a workpiece 320 to be measured, such as an item of wood, sheetrock, or other material. In one embodiment the catch 600 can also be slidable in a direction parallel to the longitudinal axis 204 of the rule blade 200. In one embodiment when the catch 600 is slid to one extreme of its sliding motion, the catch 600 is flush with the lower surface 220 of the rule blade 200.

Figure 8:
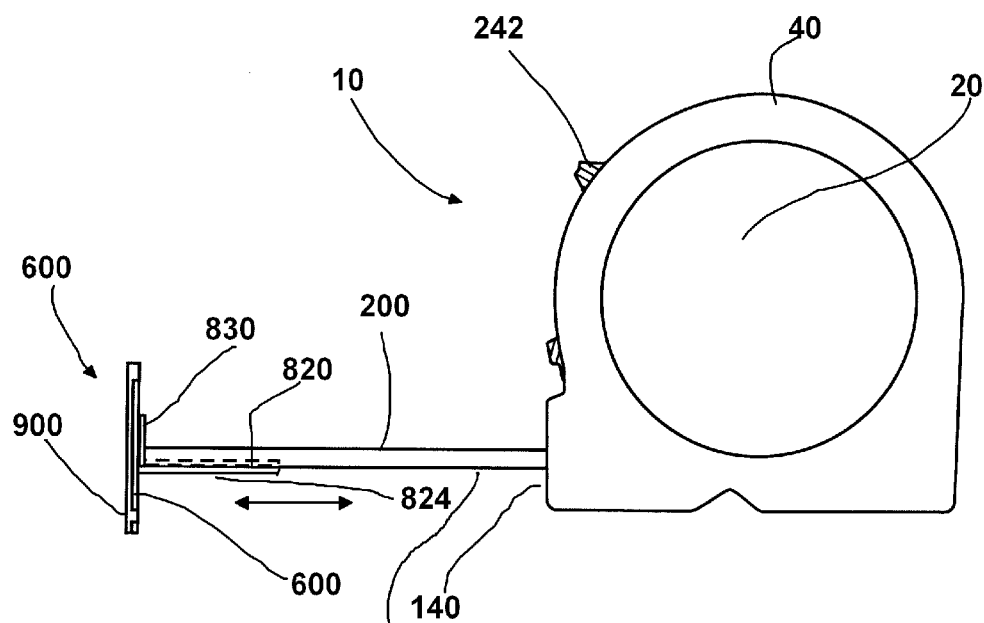
FIG. 8 is a side view of L bracket version of FIG. 4.
Figure 10:
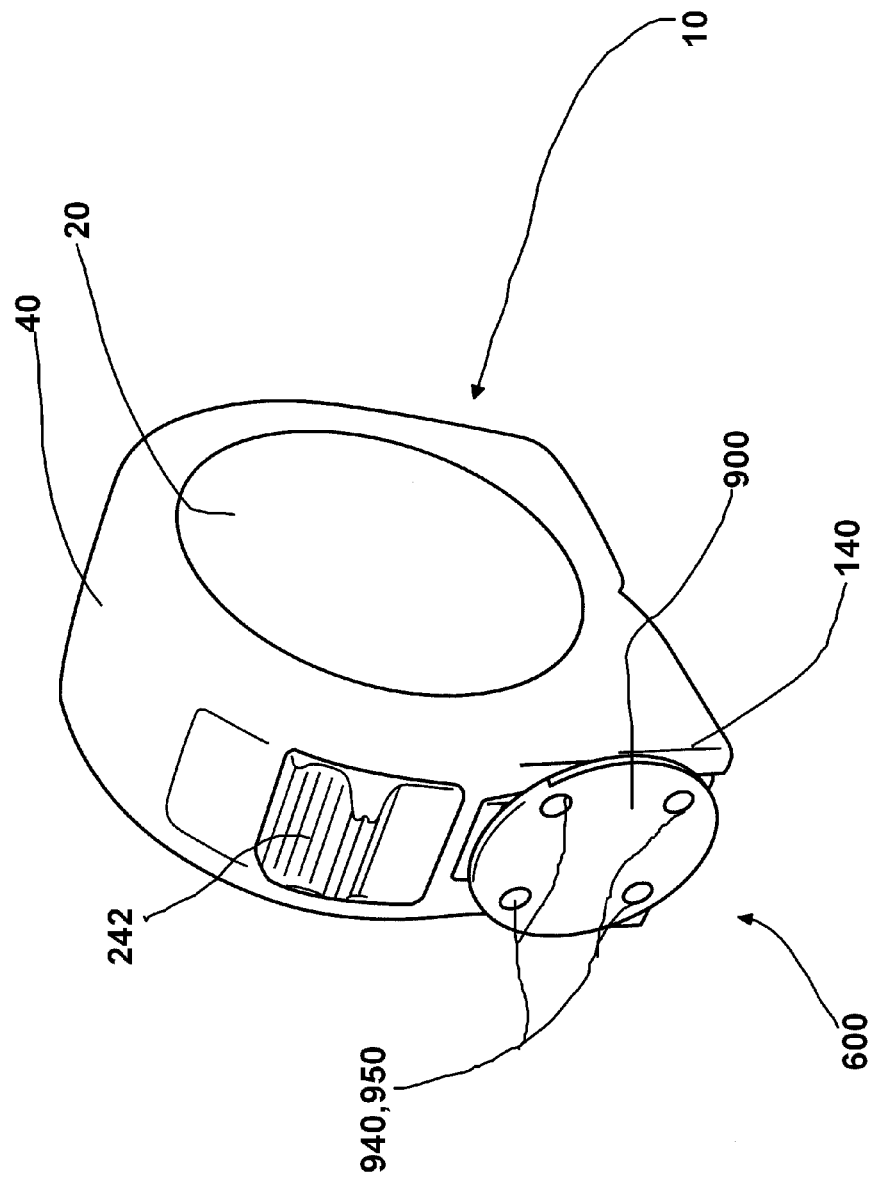
FIG. 10 includes a retracted view of L bracket version of FIG. 4.

FIG. 1 is an exploded view of L-bracket version of support 820 for rotating and sliding catch 600, including a backing plate 830 for support 820 to stabilize catch 600 and limit its wobble. FIG. 4 is a perspective view of assembled L bracket version of support 820. FIG. 6 is a perspective view of assembled L bracket support 820 version shown in FIG. 3, but viewed from the opposite side as shown in FIG. 4. FIG. 8 is a side view of L bracket support 820 version of FIG. 4. FIG. 10 includes a retracted view of rule blade 200 for L bracket support 820 version.

With backing plate 830 raised with respect to first or top face 201 of rule blade 200, this embodiment has the advantage of allowing catch to slide vertically upward (schematically indicated by arrow in FIG. 4) so that becomes flush with second or bottom face 202 of rule blade 200.

Catch 600 can comprise first face 610 and second face 620, and can be disk shaped. Catch 600 can include slot 700 having first 710 and second 720 ends, which slot 700 can include recessed peripheral area 730 on first face 610.

Catch 600 can be slidably and rotatably connected to rule blade 200 using fastener 800, which includes head and rod 804. In one embodiment fastener 800 can be a rivet or threaded fastener. Fastener 800 can connect catch 600 to rule blade 200 by connecting to connector support 820. Connector support 820 can include base 830 with opening 834. Connector 820 itself can be attached to rule blade 200 using a plurality of rivets 860. In one embodiment connector 820 can shift along the longitudinal axis 202 of rule blade 200 to accommodate the overall thickness of catch 600 depending on whether first face 610 or second face 620 contacts the workpiece being measured. In one embodiment spacer or washer 810 can be used between fastener 800 and catch 600 where spacer or washer 810 is a little less than the overall width of peripheral recessed area 730.

Figure 7:
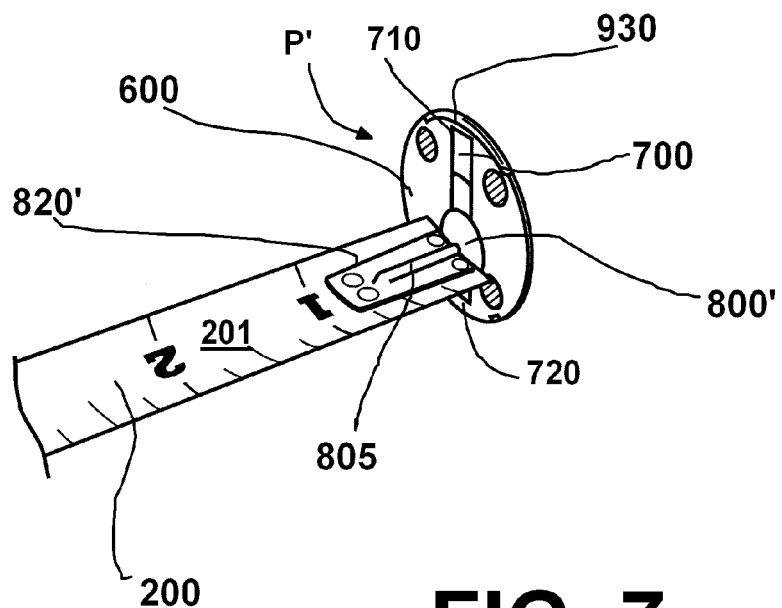
FIG. 7 is a perspective view of assembled alternative version shown in FIG. 4, but viewed from the opposite side as shown in FIG. 5.

As schematically shown in FIG. 6, in one embodiment the catch 600 can have a maximum dimension H1 and the catch 600 is slidable relative to the rule blade 200 at least about 50 percent of the maximum dimension. Here the amount of slidability would be controlled by the distance between first and second edges 710, 720 of slot 700 relative to the amount of vertical space connector 800 takes up in slot 700. This maximum slidability is schematically indicated as H2. In FIG. 6, P indicates the amount of sliding from its uppermost position at position 710 of slot 700. FIG. 7 shows a P which is larger than the P shown in FIG. 6 indicating that the catch 600 has been slid upwardly or in the direction of arrow 1280 (although catch 600 can continue to be slid upwardly in the direction of arrow 1280 until connector 800 contacts end 720 of slot 700). In other embodiments the catch 600 can be slidable relative to the rule blade 200 at least about 25, 30, 35, 45, 50, 55, 60, 65, 70, 75, 80, 85, 90, 92, 94, 96, 97, 98, and 99 percent of the maximum dimension. In other embodiments the range of slidability between the catch 600 and the rule blade 200 is between any two of the above specified percentages.

In one embodiment the catch 600 can be circular in shape, the slot 700 is located on a diameter of the catch 600 and in the middle of the diameter.

In one embodiment the catch 600 can include a magnetized surface on its first face 610. In one embodiment the catch 600 can include a magnetized surface on its second face 620. In one embodiment catch 600 can includes a plurality of seats 750 for a plurality of magnets 950. In one embodiment seats 750 in catch 600 can be slightly smaller than magnets 950 which fit into seats 750. Magnets 950 can assist catch 600 in maintaining contact with a metal workpiece to be measures. In one embodiment magnets 950 can assist in maintaining the position of catch 600 relative to casing 40 of tape measure 20.

Figure 11:
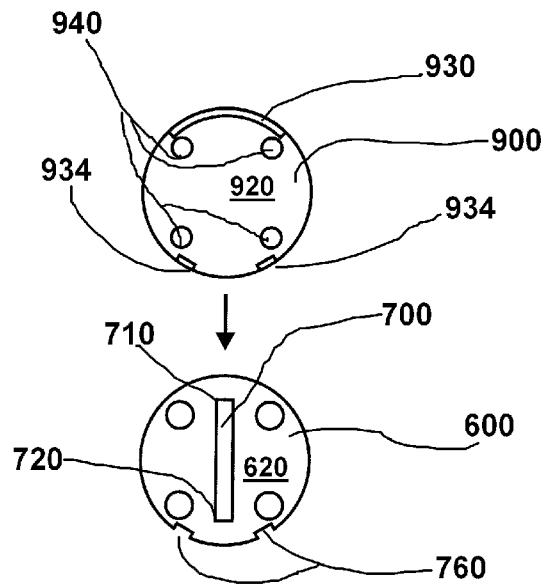
FIG. 11 includes a rear view schematically indicating attachment of the cover to the catch shown in FIGS. 1 and 2.
Figure 12:
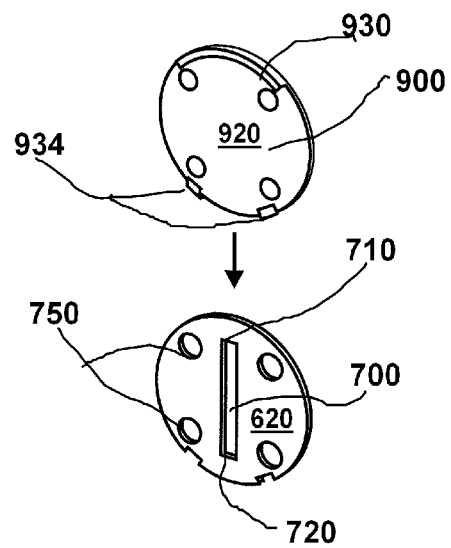
FIG. 12 includes a perspective rear view schematically indicating attachment of the cover to the catch shown in FIGS. 1 and 2.
Figure 13:
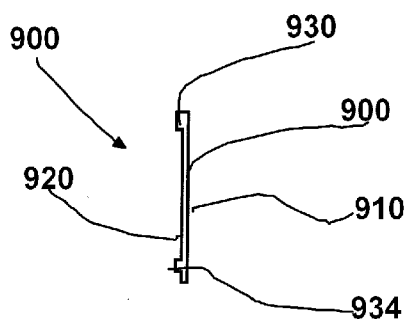
FIG. 13 is a side view of the cover.
Figure 14:
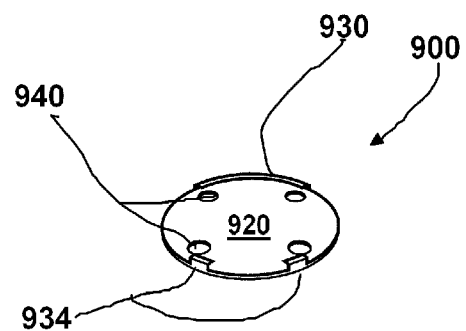
FIG. 14 is a top perspective view of the cover.

In one embodiment, catch 600 can include a cover 900 which conceals first side 610 of catch 600. Cover 900 can include first side 910, second side 920, upper connector portion 930, and lower connector portion 934. Cover 940 can also include a plurality of openings 940, which openings are preferably smaller than the sizes of plurality of magnets 950. FIG. 11 includes a rear view schematically indicating attachment of the cover 900 to the catch 600. FIG. 12 includes a perspective rear view schematically indicating attachment of the cover 900 to the catch 600. FIG. 13 is a side view of the cover 900. FIG. 14 is a top perspective view of the cover 900.

In one embodiment catch 600 can include a frictional gripping surface, such as being rubber coated, on its first 610 and/or second 620 faces and/or its perimeter edge. The frictional gripping surface can resist slippage of catch 600 with respect to an item being measured. In one embodiment the gripping surface for the first face 610 of catch can be included on the front and perimeter of cover 900. Preferably, the gripping surface will be used without magnets as it is believed that the extra thickness of the gripping surface will substantially reduce the amount of magnetized pull from magnets 950 reducing their effectiveness.

Figure 9:
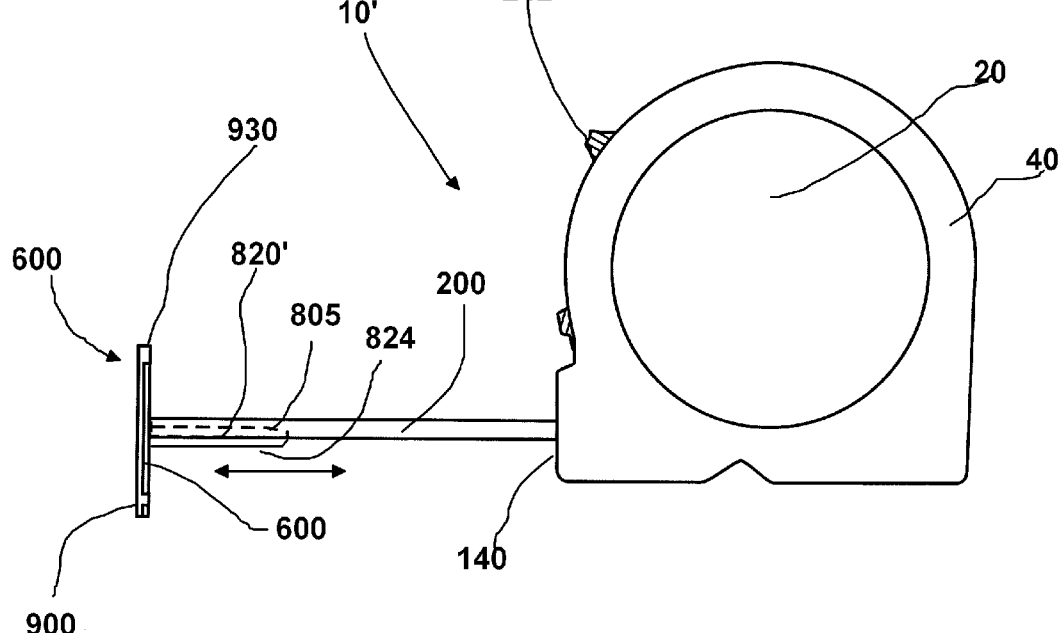
FIG. 9 is a side view of alternative version of FIG. 5.

FIG. 2 is an exploded view of alternative version of connector 820' using a pin 800' to mount the catch 600 instead of rivet 800. In this embodiment inclined portion 805 can be provided to resist snagging items to be measured when first or top face 201 of rule blade 200 is adjacent a surface to be measured. FIG. 3 is a perspective view of the catch 600 but viewed from the opposite view as shown in FIG. 2. FIG. 5 is a perspective view of assembled alternative version of support 820. FIG. 7 is a perspective view of assembled alternative support 820' version shown in FIG. 4, but viewed from the opposite side as shown in FIG. 5. FIG. 9 is a side view of alternative support 820' version of FIG. 5.

FIGS. 15-17 schematically indicate the allowable sliding and/or rotating motions which can be made between the catch 600 and rule blade 200. FIG. 15 schematically indicates rotation in the direction of arrow 1200. FIG. 16 schematically indicates sliding in the direction of arrows 1210 (indicating that either direction of vertical sliding is available). FIG. 16 schematically indicates sliding in the direction of arrows 1220 (indicating that either direction of horizontal sliding is available). In various embodiments one or more of the movements schematically indicated in either FIG. 15, 16, and/or 17 can be combined at different times. For example, rotation can be made with sliding following. As another example, sliding can be made with rotation following. As another example, rotation can be combined with sliding. In different embodiments sliding can be in different directions compared to strictly vertical or strictly horizontal. In different embodiments the amount of sliding is restricted by the length of the slot compared to the size of the fastener.

In various embodiments the catch 600 is frictionally held in place regarding sliding and/or rotation relative to rule blade

200, however, application of a force to rule blade 200 can overcome such frictional resistance causing relative movement between the catch 600 (sliding and/or rotation) relative to the rule blade 200. In one embodiment the catch 600 is slidable when after the rule blade 200 has been extended past the user's arm span. In one embodiment this slidability occurs by using the rule blade 200 to place a force on the catch/end hook 600 in contact with another surface (such as by tapping the catch 600 on the surface to position the catch relative to the rule blade 200). In one embodiment the catch 600 can be moved relative to the rule blade 200 by force applied on the catch 600 from the rule blade 200 itself.

In one embodiment the catch 600 can be frictionally held in place regarding sliding relative to the rule blade 200, and a predetermined force between the catch 600 and the rule blade 200 to overcome this frictional resistance required to begin sliding of the catch 600 relative to the rule blade 200. In various embodiments the predetermined force required to overcome frictional resistance and begin sliding is less than about 10, 8, 6, 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.005, and/or 0.001 pounds force. In other embodiments this predetermined force required to overcome frictional resistance and begin relative sliding between catch 600 and rule blade 200 is between about any two of the above specified predetermined forces.

In one embodiment the catch can be frictionally held in place regarding rotation relative to the rule blade, and a predetermined torque between the catch 600 and the rule blade 200 is required to begin rotation of the catch 600 relative to the rule blade 200. In various embodiments the predetermined torque required to overcome frictional resistance and begin rotation between the catch 600 and the rule blade is less than about 10, 8, 6, 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.005, and/or 0.001 inch-pounds force of torque. In other embodiments the predetermined torque required to overcome frictional resistance and begin relative rotation between the catch 600 and the rule blade 200 is between about any two of the above specified predetermined torques.

In one embodiment is provided a tape measure apparatus 10 comprising:

a) a casing 40 having two side walls 60,80, a bottom wall 100, a rear wall 120, and a front wall 140 defining an enclosure, the front wall having a blade aperture 180 adjacent the bottom wall 100;

b) a rule blade 100 having inner and outer end portions and being retractably stored in a coiled condition within said enclosure of the casing 40, the inner end of the rule blade 200 secured within the enclosure, the outer end of the rule blade 200 protruding through the blade aperture 180 when extended during use, and when extended during use the rule blade 200 having a longitudinal axis 204;

c) graduated indicia markings 220 along the length of said rule blade 200, functioning as a measuring scale;

d) a catch 60 operatively connected to the outer end of the rule blade 200, the catch 600 being slidable relative to the outer end of the rule blade 600 in a plane 208 which is perpendicular to the longitudinal axis 204 of the rule blade 200.

In one embodiment the catch 600 can be rotatable relative to the outer end of the rule blade 200 in the plane 208 which is perpendicular to the longitudinal axis 204 of the rule blade 200, and wherein rotation can exceed 180 degrees and can be about points which include the geometric center of the face of the catch along with points which are offset from the geometric center of the face of the catch 600. In various embodiments the rotation between the catch 600 and the rule blade 200 can exceed about 180, 200, 220, 240, 260, 280, 300, 320, 340, and/or 360 degrees. In other embodiments the amount of rotation can be between about any two of the above specified angular rotations.

In various of the above referenced embodiments catch/end hook 600 can rotate and/or slide relative to rule blade 200 without the user touching catch/end hook 600. For example, the user can apply force on rule blade 200 which caused force to be applied on catch 600 which force causes relative movement between catch 600 (rotation and/or sliding) and rule blade 200.

Figure 18:
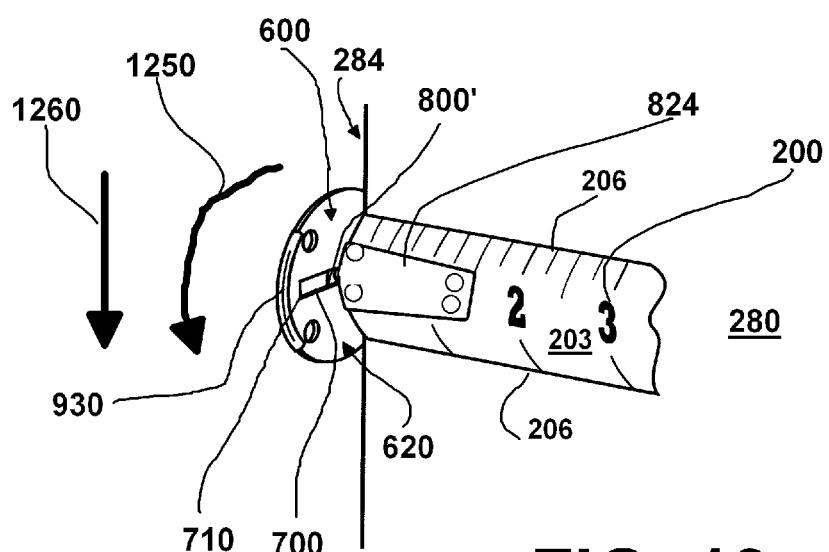
FIGS. 18 and 19 schematically indicate movement of the catch to measure a corner of a wall having free space behind the corner.
Figure 19:
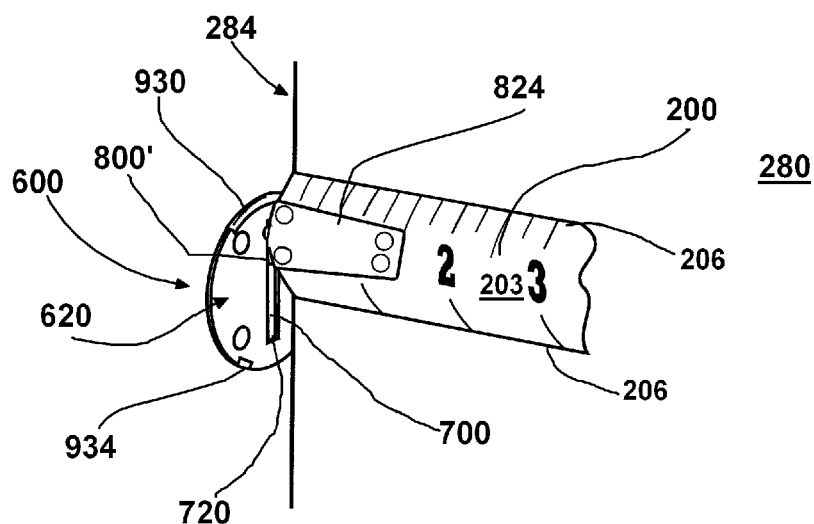

FIGS. 18 and 19 schematically indicate movement of the catch to measure a corner of a wall having free space behind the corner. When measuring a vertical surface, catch/end hook 600 can both rotate and slide downwardly (schematically indicated by arrows 1250 and 1260) relative to rule blade 200 allowing rear portion 620 to contact edge 284, along with allowing upper edges 206 of rule blade 200 to contact the surface being measured 280 (which is believed to reduce sliding of rule blade 200 relative to surface 280 compared to having bottom 203 in contact with surface 280).

Figure 20:
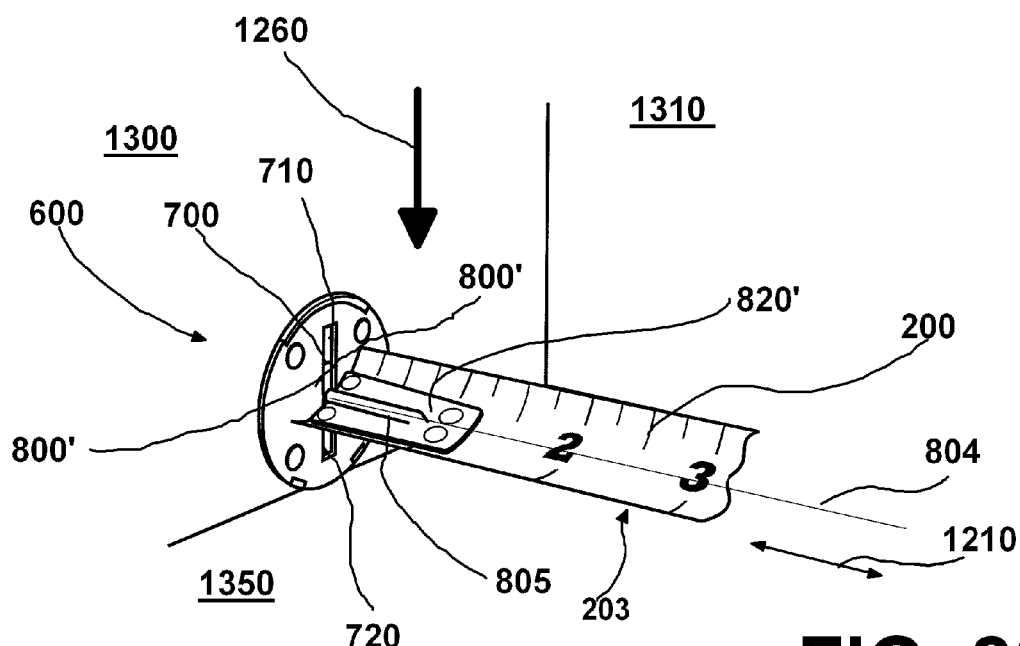
FIGS. 20 and 21 schematically indicate movement of the catch to measure a corner of a wall wherein the catch cannot move beyond the corner.
Figure 21:
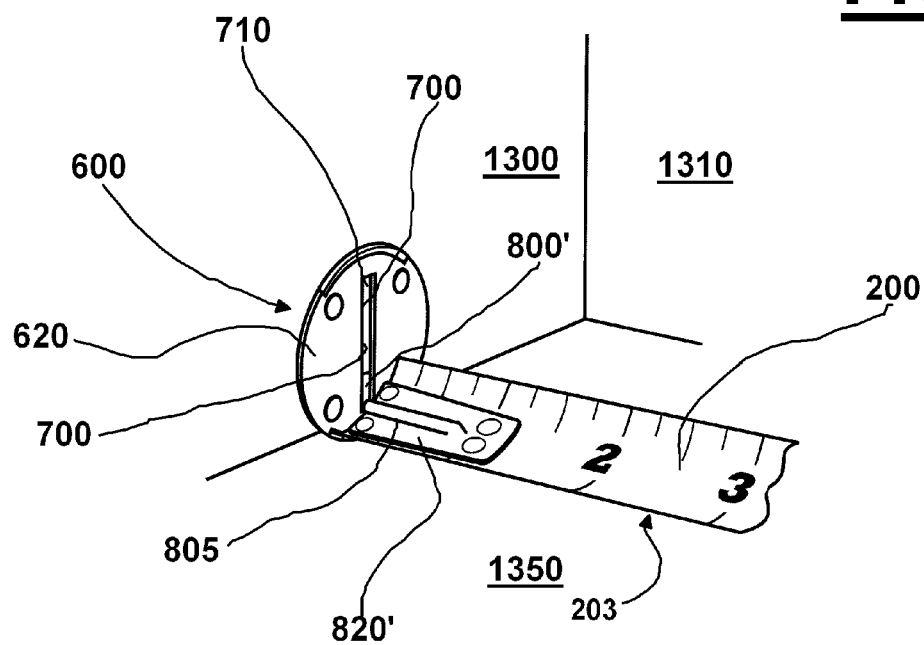

FIGS. 20 and 21 illustrate a second application edge of base 1350 is completely blocked by wall 1300, where the catch 600 cannot move beyond the corner between wall 1300 and base 1350. Catch/end hook 600 can slide upwards allowing rule blade 200 to slide relatively downwards (schematically indicated by arrow 1260) relative to rule blade 200 allowing bottom 203 to contact base 1350 thereby allowing a more accurate measurement to be taken by limiting the amount of bowing of rule blade 200 between catch 600 and tape measure (with the user pushing rule blade 200 down towards base 1350). In this manner rule blade 200 maintains a parallel shape for the measuring portion of rule blade 200. The movement in the direction of arrow 1260 reduces the distance "D" between bottom 203 of rule blade 200 and the top 282 of the workpiece to be measured. In this manner rule blade 200 maintains a parallel shape for the measuring portion of rule blade 200. Additionally, support 820' for catch 600 can shift in a line parallel to longitudinal axis 204 of rule blade 200 (schematically indicated by arrow 1210) an amount equal to the thickness of catch 600 (distance between first 610 and second 620 faces) to ensure that an accurate measurement is read (accommodating the thickness of catch 600 where front 610 face of catch 600 is blocked). Typically measurements are taken with second face 620 grabbing/hooking onto the edge of the workpiece.

Figure 22:
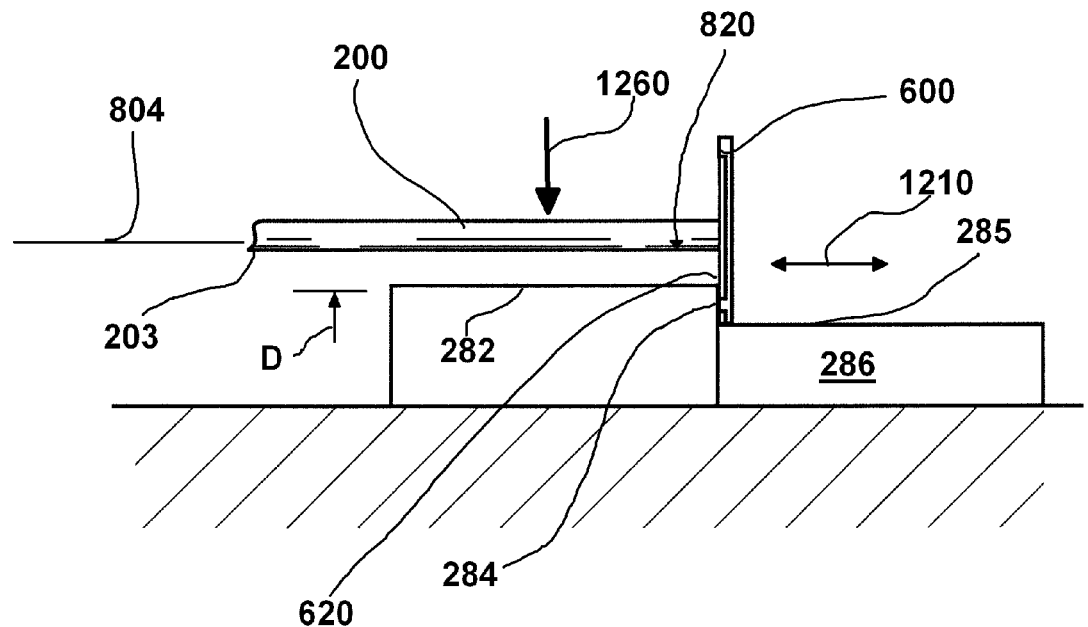
FIGS. 22 and 23 schematically indicate movement of the catch to measure a corner of a workpiece where the corner is partially restricted.
Figure 23:
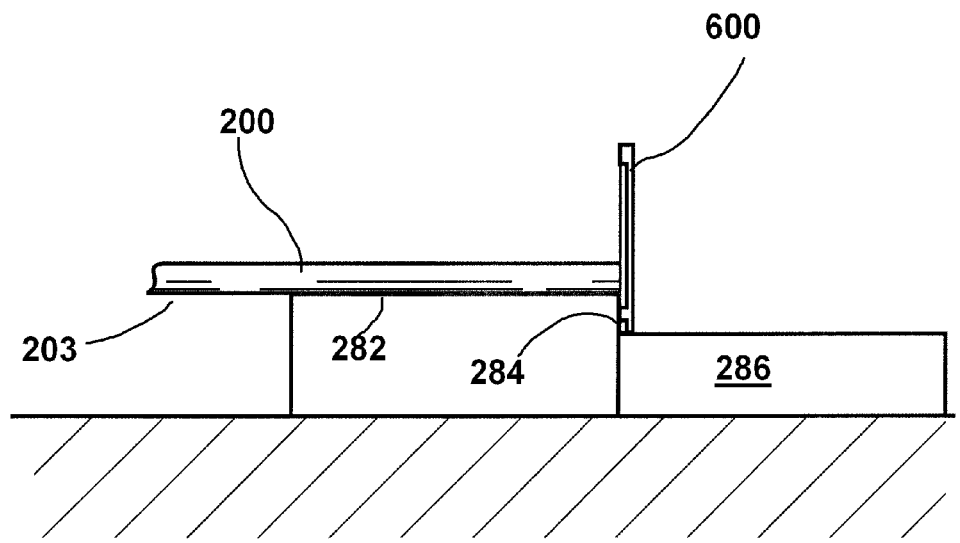

FIGS. 22 and 23 schematically illustrate a third application where catch 600 is provided minimal depth to grab hold of the workpiece being measured. Catch/end hook 600 is shown in a position generally considered when using prior art catches/end hooks, but with the ability to slide up and down vertically relative to rule blade 200. Here the catch or end hook 600 is projecting downward and placed with its second or rear face 620 grabbing/hooking onto edge 284 of workpiece 280, but with a top 285 of second workpiece blocking downward movement of catch 600. In this instance catch 600 can slide upwards allowing rule blade 200 to slide relatively downwards (schematically indicated by arrow 1260) allowing bottom 203 of rule blade 200 to contact top 282 of workpiece 280; and facilitating a more accurate measurement to be taken by limiting the amount of bowing of rule blade 200 between catch 600 and front wall 140 of tape measure (with the user pushing rule blade 200 down towards top 282 of workpiece 280). The movement in the direction of arrow 1260 reduces the distance "D" between bottom 203 of rule blade 200 and the top 282 of the workpiece to be measured. In this manner rule blade 200 maintains a parallel shape for the measuring portion of rule blade 200.

Figure 24:
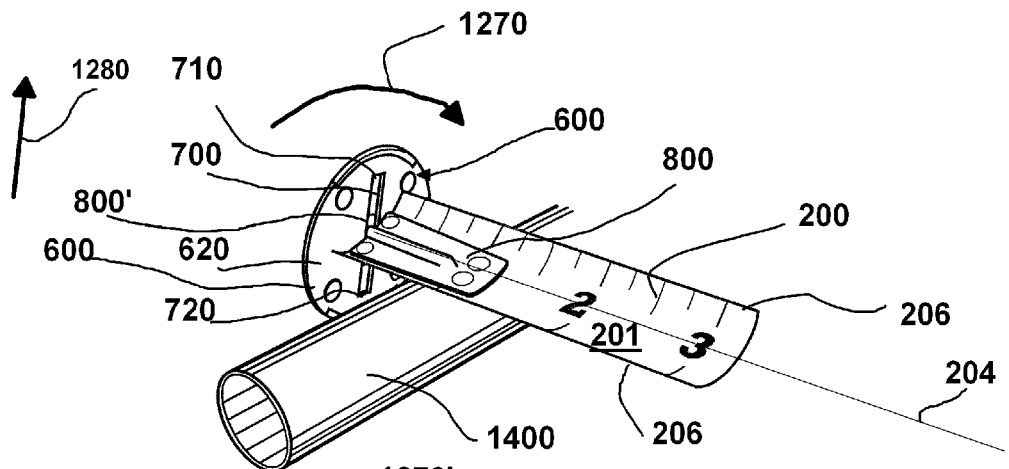
FIGS. 24 through 26 schematically indicate movement of the catch to measure a rounded object such as a pipe.
Figure 25:
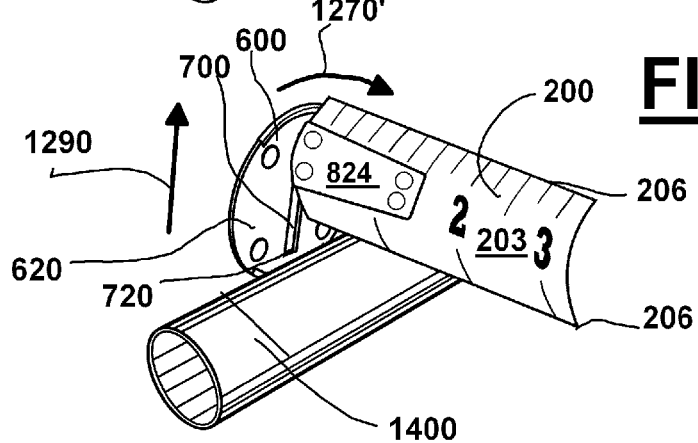
Figure 26:
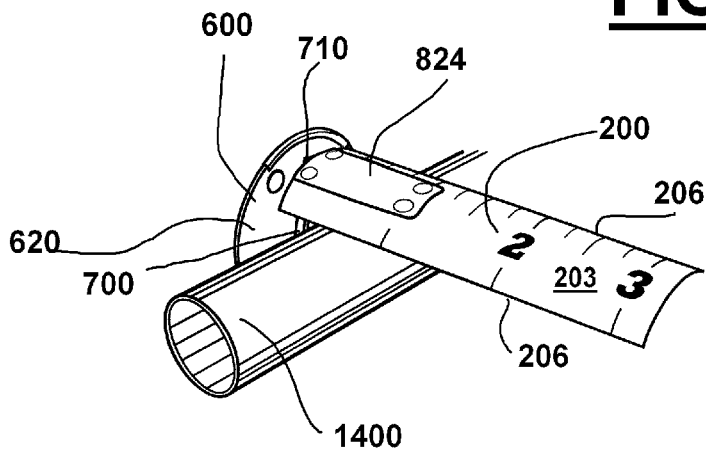

FIGS. 24, 25, and 26 schematically illustrate a fourth application, indicating movement of the catch to measure a rounded object (e.g., a pipe). In this application catch/end hook 600 can both rotate (and slide downwardly (schematically indicated by arrows 1270 and 1280) relative to rule blade 200 allowing rule blade to move from the position shown in FIG. 22 to the position shown in FIG. 23. Catch/end hook 600 can further rotate and slide downwardly allowing upper edge portions 206 of rule blade 200 to contact surface of pipe 1400.

Figure 27:
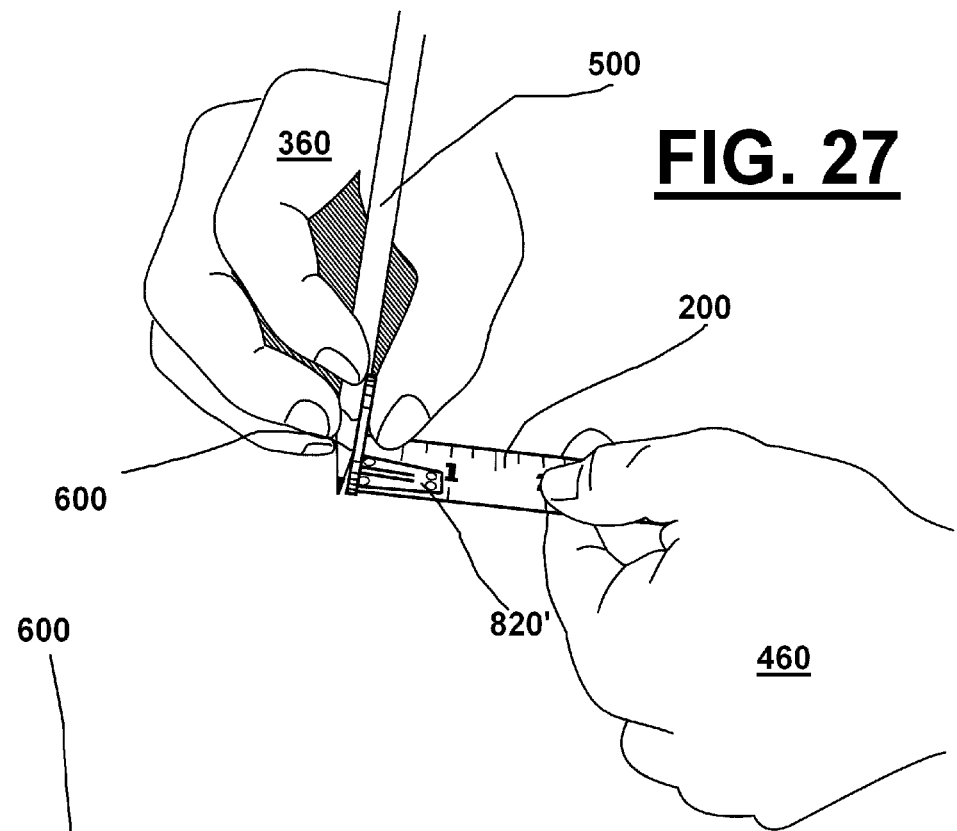
FIG. 27 shows the catch being used as a marking guide.

FIG. 27 shows the catch 600 being used as a marking guide. In this embodiment catch 6002 is slid upwardly relative to rule blade 200 such that bottom of catch 600 is raised to its uppermost extent. Catch 600 can be used as a base to grab and hold steady sip of marking instrument (e.g., pencil). In a preferred embodiment bottom of catch 600 is flush with second or bottom side 203 of rule blade so that a measured distance can be marked with tip of pencil 500. In this embodiment catch steadies pencil 500 and tip of pencil can be flush with bottom 203 of rule blade 200 with bottom 203 of rule blade 200 touch the surface to be marked.

Figure 28:
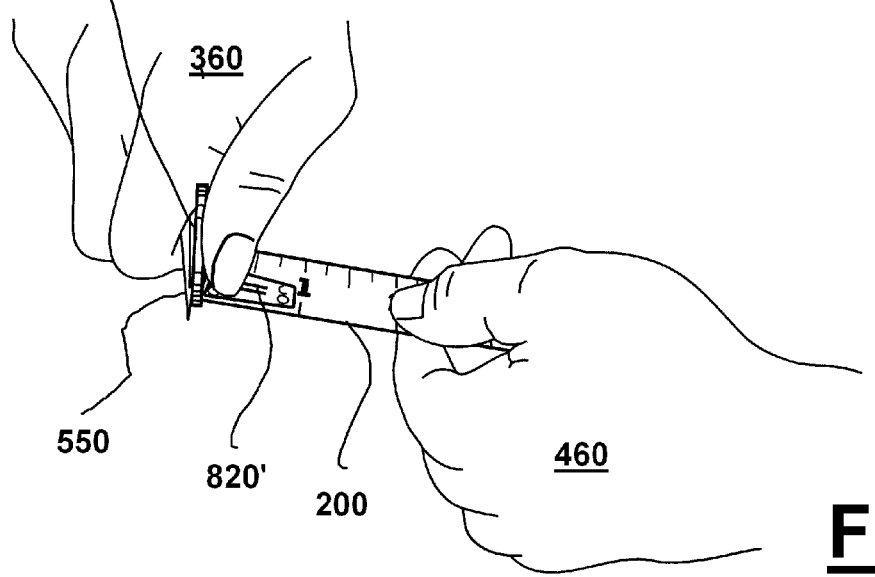
FIG. 28 shows the catch being used as a cutting guide.

FIG. 28 shows the catch 600 being used as a cutting guide for a knife 550. Catch 600 can be used as a base to grab and hold steady tip of knife 550. In a preferred embodiment bottom of catch 600 is flush with second or bottom side 203 of rule blade so that a measured distance can be marked with tip of knife 550. In this embodiment catch steadies knife 550 and tip of pencil can be flush with bottom 203 of rule blade 200 with bottom 203 of rule blade 200 touch the surface to be cut.

It will be understood that each of the elements described above, or two or more together may also find a useful application in other types of methods differing from the type described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims:

The following is a Table of reference numerals used in this application:

REFERENCE NUMERAL LIST

| Reference No. | Description |
| --- | --- |
| 10 | tape measure apparatus |
| 20 | tape measure |
| 40 | casing |
| 45 | casing screws |
| 60 | side wall of casing |
| 80 | top wall of casing |
| 100 | bottom wall of casing |
| 120 | rear wall of casing |
| 140 | front wall of casing |
| 142 | quick lock/quick unlock for catch (e.g., magnet) |
| 160 | enclosure in casing |
| 165 | front wall of enclosure |
| 170 | rear wall of enclosure |
| 180 | aperture in casing for rule blade |
| 182 | base of aperture in casing |
| 200 | rule blade of tape measure |
| 201 | first or top surface |

-continued

| Reference No. | Description |
| --- | --- |
| 203 | second or bottom surface |
| 204 | longitudinal axis |
| 205 | inner end of rule blade |
| 206 | top edges of rule blade |
| 208 | perpendicular or orthogonal plane |
| 210 | outer end of rule blade |
| 220 | graduated indicia markings on rule blade |
| 240 | lock and automatic rewind switch of tape measure |
| 242 | rule blade locking bar |
| 243 | locking tabs |
| 260 | end hook of rule blade |
| 262 | rivets for end hook |
| 280 | work piece |
| 282 | top of work piece |
| 284 | edge of workpiece |
| 286 | top of second workpiece |
| 320 | top of workpiece |
| 360 | first hand |
| 380 | finger of first hand |
| 400 | index finger of first hand |
| 420 | thumb of first hand |
| 460 | second hand |
| 480 | fingers of second hand |
| 500 | pencil |
| 550 | knife |
| 600 | catch |
| 610 | first face |
| 620 | second face |
| 700 | positioning slot |
| 710 | first end of positioning slot |
| 720 | second end of positioning slot |
| 730 | recess area of positioning slot |
| 750 | plurality of openings |
| 760 | plurality of notches |
| 800 | connector for catch to rule blade |
| 804 | rod portion |
| 805 | inclined portion |
| 810 | washer |
| 820 | support |
| 824 | reinforcing plate or brace |
| 830 | base |
| 834 | opening |
| 850 | openings |
| 860 | plurality of fasteners |
| 900 | cover for catch |
| 910 | first side |
| 920 | second side |
| 930 | upper connector portion |
| 934 | lower connector portion |
| 940 | plurality of openings |
| 950 | plurality of magnets |
| 1000 | plurality of magnets |
| 1200 | arrow |
| 1210 | arrow |
| 1220 | arrow |
| 1230 | arrow |
| 1250 | arrow |
| 1260 | arrow |
| 1270 | arrow |
| 1280 | arrow |
| 1290 | arrow |
| 1300 | wall |
| 1310 | wall |
| 1350 | base |
| 1300 | wall |
| 1310 | wall |
| 1350 | base |
| 1400 | pipe |

All materials used or intended to be used in a human being are biocompatible, unless indicated otherwise. The insert 560 and other items may be constructed of metal, plastic, injection molded plastic, wood, or any other material which is substantially strong and durable.

The foregoing embodiments are presented by way of example only; the scope of the present invention is to be limited only by the following claims.

The invention claimed is:

1. A tape measure apparatus comprising:
   a) a casing having two side walls, a bottom wall, a rear wall, and a front wall defining an enclosure, the front wall having a blade aperture adjacent the bottom wall;
   b) a rule blade having inner and outer end portions and being retractably stored in a coiled condition within said enclosure of the casing, the inner end of the rule blade secured within the enclosure, the outer end of the rule blade protruding through the blade aperture when extended during use, and when extended during use the rule blade having a longitudinal axis;
   c) graduated indicia markings along the length of said rule blade, functioning as a measuring scale;
   d) a catch operatively connected to the outer end of the rule blade, the catch being slidable relative to the outer end of the rule blade in a plane which is perpendicular to the longitudinal axis of the rule blade.

2. The tape measure apparatus of claim 1, wherein the catch is rotatable related to the outer end of the rule blade in the plane which is perpendicular to the longitudinal axis of the rule blade, and wherein rotation can exceed 270 degrees and can be about points which include the geometric center of the face of the catch along with points which are offset from the geometric center of the face of the catch.

3. The tape measure apparatus of claim 1, wherein the catch includes a slot, and the slot is operatively connected to the rule blade with a fastener.

4. The tape measure apparatus of claim 3, wherein the catch includes first and second faces, the second face facing the rule blade, the first face having a peripheral recessed area on either side of the slot, the fastener including a head, and the head being accommodated by the recess so that it does not protrude beyond the first face.

5. The tape measure apparatus of claim 4, wherein the catch further comprises a cover which covers the peripheral recessed area and the head.

6. The tape measure apparatus of claim 1, wherein the catch has a maximum dimension and the catch is slidable relative to the rule blade at least about 50 percent of the maximum dimension.

7. The tape measure apparatus of claim 1, wherein the catch has a maximum dimension and the catch is slidable relative to the rule blade at least about 75 percent of the maximum dimension.

8. The tape measure apparatus of claim 1, wherein the catch has a maximum dimension and the catch is slidable relative to the rule blade at least about 85 percent of the maximum dimension.

9. The tape measure apparatus of claim 1, wherein the catch has a maximum dimension and the catch is slidable relative to the rule blade at least about 90 percent of the maximum dimension.

10. The tape measure apparatus of claim 1, wherein the catch has a maximum dimension and the catch is slidable relative to the rule blade at least about 95 percent of the maximum dimension.

11. The tape measure apparatus of claim 1, wherein the rule blade has upper and lower surfaces, and when the catch is slid to one extreme of its sliding motion, the catch is flush with the lower surface of the rule blade.

12. The tape measure apparatus of claim 1, wherein the catch is circular in shape, the slot is located on a diameter of the catch and in the middle of the diameter.

13. The tape measure apparatus of claim 1, wherein the catch includes a magnetized surface on its first face.

14. The tape measure apparatus of claim 1, wherein the catch includes a magnetized surface on its second face.

15. The tape measure apparatus of claim 1, wherein the catch is frictionally held in place relative to the rule blade.

16. The tape measure apparatus of claim 15, wherein when the rule blade is extended more than twelve inches, force can be imposed on the tape measure casing or rule blade causing the catch to slide relative to the rule blade in the plane perpendicular to the longitudinal axis.

17. The tape measure apparatus of claim 2, wherein the catch is frictionally held in place relative to the rule blade.

18. The tape measure apparatus of claim 17, wherein when the rule blade is extended more than twelve inches, force can be imposed on the tape measure casing or rule blade causing the catch to both slide and rotate relative to the rule blade in the plane perpendicular to the longitudinal axis.

19. The tape measure apparatus of claim 1, wherein the catch is also slidable in a direction parallel to the longitudinal axis of the rule blade.

* * * * *